(12) United States Patent
Terashita et al.

(10) Patent No.: US 6,426,572 B1
(45) Date of Patent: Jul. 30, 2002

(54) SWITCHING FUNCTION PROPERLY-ALTERABLE SWITCH UNIT, AND VEHICLE MOUNTED DEVICE CONTROL APPARATUS INCLUDING THE SAME SWITCH UNIT

(75) Inventors: Satoshi Terashita; Satoshi Sakamoto, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 17 days.

(21) Appl. No.: 09/597,605

(22) Filed: Jun. 20, 2000

(30) Foreign Application Priority Data

Jun. 22, 1999 (JP) .......................................... 11-175676

(51) Int. Cl.[7] .................................................. H01H 9/00
(52) U.S. Cl. ........................ 307/134; 307/9.1; 307/10.1; 200/314
(58) Field of Search ..................... 307/134, 9.1, 10.1; 200/314

(56) References Cited

U.S. PATENT DOCUMENTS

| | | |
|---|---|---|
| 4,172,251 A | 10/1979 | Faustini |
| 4,350,857 A | 9/1982 | Fillus et al. |
| 4,376,879 A | 3/1983 | Nagata et al. |
| 5,138,119 A * | 8/1992 | Demeo .......................... 200/5 |
| 5,811,891 A | 9/1998 | Yanase |
| 5,990,571 A | 11/1999 | Sato et al. |

FOREIGN PATENT DOCUMENTS

DE 198 24 197 A1 12/1998

* cited by examiner

*Primary Examiner*—Kim Huynh
*Assistant Examiner*—Robert L. Deberadinis
(74) *Attorney, Agent, or Firm*—Brinks Hofer Gilson & Lione

(57) ABSTRACT

The present invention relates to a high-reliability vehicle mounted device control apparatus capable of making a decision about functions of switch units with a simple structure and at a high processing speed and a low cost. Each of the switch units comprises a circuit substrate having a required circuit pattern formed to include a plurality of pairs of short-circuiting possible land portions, and a switch mounted on the circuit substrate so that any one of the plurality of pairs of land portions are short-circuited selectively to set a switching function inherent to that switch unit. Any one selected from the switch units is mounted in one of the unit mounting sections, and the switch of that switch unit is turned on. A switch unit decision section constituting a control section detects the land portions short-circuited to automatically make a decision about the kind of a switching function of the mounted switch unit.

14 Claims, 4 Drawing Sheets

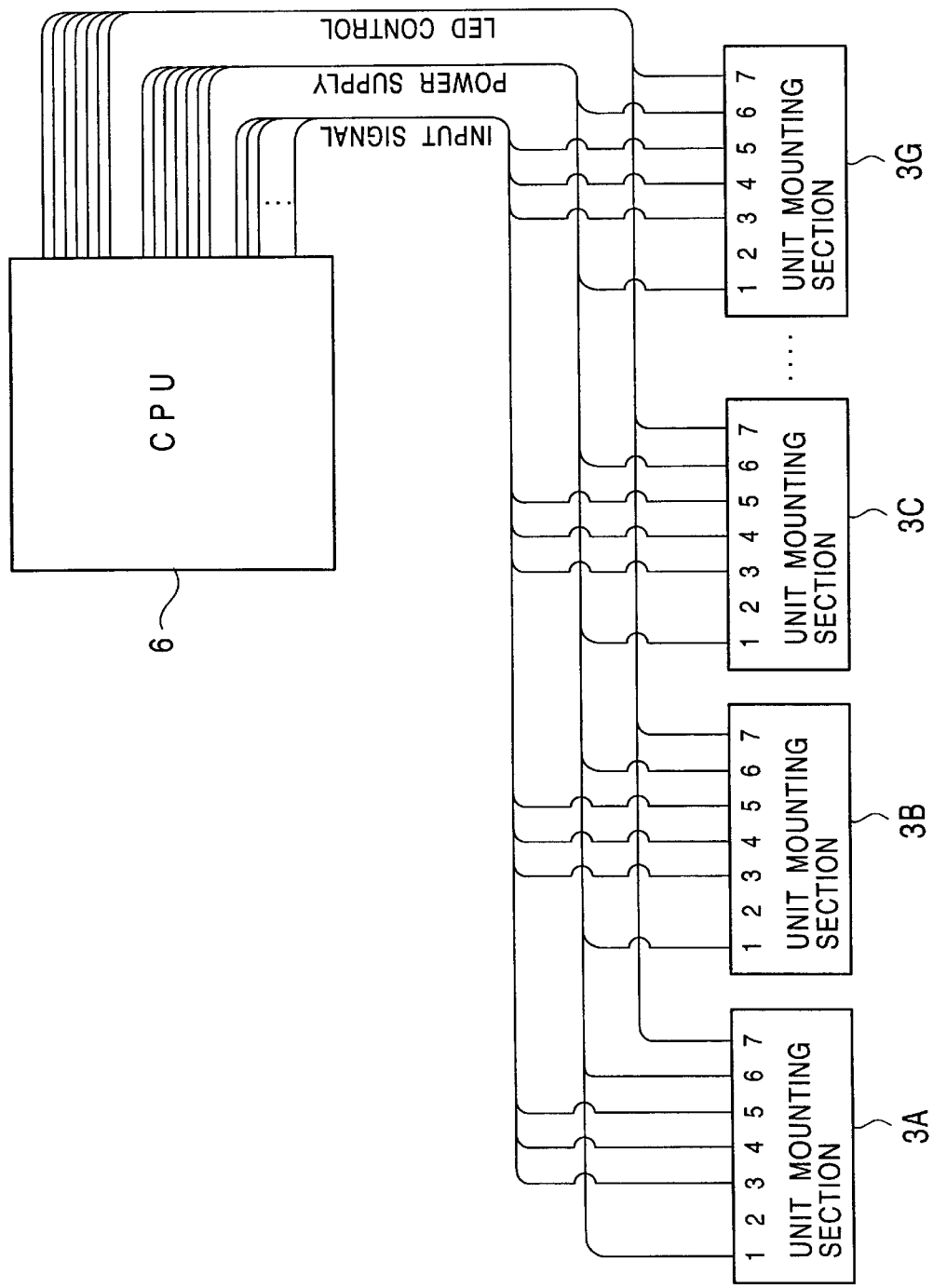

SWITCHING FUNCTION PROPERLY-ALTERABLE SWITCH UNIT, AND VEHICLE MOUNTED DEVICE CONTROL APPARATUS INCLUDING THE SAME SWITCH UNIT

BACKGROUND OF THE INVENTION

1. Field of the Invention

The present invention relates to a switch unit and a vehicle mounted device control apparatus using this switch unit, and more particularly to a structure of a switch unit in which switching functions are alterable properly, and to a vehicle mounted device control apparatus which, when this type of switch unit is mounted in a unit mounting section, automatically makes a decision on the type of switching function of the mounted switch unit.

2. Description of the Related Art

In conventional motor vehicles, a plurality of manual switches are disposed on a panel surface of an instrument panel for controlling air conditioning in the interior of a room so that selective operation of any one of these manual switches performs switching between heating and cooling for the interior of the room or alteration of a set value of the in-room temperature.

Recently, in addition to the foregoing group of manual switches for air conditioning, for meeting a variety of user's options, there has been a request to place one or a plurality of optional manual switches for operations of optionally equipped devices on the surface of the instrument panel. Accordingly, so far, a switch apparatus has been proposed, which is capable of disposing a plurality of optional manual switches different in kind from each other.

This type of switch apparatus, proposed so far, has a unit mounting section which permits the mounting of a plurality of switch units provided with optional manual switches so that one switch unit or a plurality of switch units different in kinds from each other are mounted arbitrarily on the unit mounting section. Even in a case in which any kind of switch unit is mounted thereon, a control section (CPU) of a control device processes a switching signal from that switching unit to fulfill the function of that switching unit.

Furthermore, of such kinds of well-known switch apparatus, there has been known a vehicle mounted device control apparatus which, when a switch unit is mounted in the unit mounting section, performs a function to automatically make a decision as to the kind of that switch unit, one example of which is a switch apparatus disclosed in U.S. Pat. No. 5,811,891.

The switch apparatus, disclosed in U.S. Pat. No. 5,811,891, is composed of a plurality of kinds of switch units, a control device for selectively putting these switch units in a unit mounting section, and a control circuit unit built in the control device. In addition, on the switch unit side, a recognition signal issuing means is provided for generating a recognition signal peculiar to that switch unit while, on the control circuit unit side, a switch decision circuit is provided which, upon receipt of the recognition signal, generates a drive signal for driving a predetermined load. The recognition signal issuing means has internal wiring varying according to the kinds of switch units to, in response to operation (turning-on) of switches of the switch unit, output different recognition signals (switch signals). The switch decision circuit includes a plurality of logic circuits, a plurality of input terminals and a plurality of output terminals. This switch decision circuit is for, when a recognition signal (switch signal) is supplied from the mounted switch unit to any one of the plurality of input terminals, generating a drive signal to be given to a load corresponding to the function of the switch unit mounted on any one of the output terminals, in accordance with the polarity or the like of the recognition signal supplied input terminal and the supplied recognition signal (switch signal).

According to the switch apparatus disclosed in U.S. Pat. No. 5,811,891, a desired kind of switch unit is mounted in the unit mounting section of the control circuit unit and, when a switch of the switch unit is turned on, the switch unit generates a recognition signal peculiar to its function to supply the recognition signal to the switch decision circuit of the control circuit unit, while the switch decision circuit receives the recognition signal to make a decision on the kind of the mounted switch unit on the basis of the received recognition signal. Thus, only with the replacement of the switch unit to be mounted in the unit mounting section, it is possible to automatically make a decision about the switch units having various functions and to conduct operations corresponding to the functions of the switch units.

Meanwhile, although the switch apparatus disclosed in U.S. Pat. No. 5,811,891 can automatically make a decision on the kind of each of switch units having various functions and conduct an operation corresponding to the function of the switch unit only with the switch unit being mounted in the unit mounting section of the control circuit unit, in this switch apparatus, the switch unit side requires internal wiring with switches varying according to the kind of switch unit for the decision on the function of the switch unit, and the control circuit unit side requires installation of a switch decision circuit including a plurality of logic circuits, a plurality of input terminals and a plurality of output terminals.

From this point of view, in the case of the switch apparatus disclosed in U.S. Pat. No. 5,811,891, not only the switch unit decision means becomes complicated so that the manufacturing cost of the control circuit unit becomes high accordingly, but also the kinds of switch units are limited in number because limitation is imposed on combinations of the logic circuits.

For solving such problems, Japanese Patent Application No. 8-166237, already filed by the same applicant, discloses a vehicle mounted device control apparatus capable of making a decision about the functions of switch units including switches, variable resistors, and other components with an extremely simple structure without increasing the manufacturing cost.

Furthermore, in a vehicle mounted device control apparatus disclosed in U.S. Pat. No. 5,990,571, resistive elements are principally used in a switch unit to divide an analog voltage, inputted to the switch unit, with these resistive elements, and the divided analog voltages are analog/digital-converted and then processed in an CPU (control section).

Thus, in this vehicle mounted device control apparatus disclosed in U.S. Pat. No. 5,990,571, since the analog-to-digital conversion processing takes time, new problems arise, for example, in that difficulty is encountered in increasing the processing speed to a high value and in providing a high reliability because of noise superimposed at the analog voltage circuit section.

SUMMARY OF THE INVENTION

Accordingly, it is an object of the present invention to provide a vehicle mounted device control apparatus capable of making a decision about the kinds of switch units with an extremely simple structure without increasing the manufacturing cost, and further capable of conducting processing at a high speed and with high reliability, and to provide a switch unit suitable for use in the vehicle mounted device control apparatus.

For achieving this purpose, in accordance with this invention, there is provided a switch unit comprising a circuit substrate having a required circuit pattern formed to include a plurality of pairs of short-circuiting possible land portions, and a switch mounted on the circuit substrate, wherein any one of the plurality of pairs of land portions are short-circuited selectively to set a switching function of the switch.

In addition, according to this invention, a display for showing the switching function of the switch can be provided on an outer surface of each of key tops for manipulating the switch, and this display can be of a transmission type making transmission of light from an light-emitting diode installed in the switch unit.

The foregoing means permits a circuit pattern to be formed on a circuit substrate to be used in common to various switch units different in type of switching function from each other, and a switch unit having a required switching function is attainable only in a manner that predetermined land portions are short-circuited through the use of a jumper chip or the like. Accordingly, it is possible to manufacture various switch units having different types of switching function from each other at a low cost, which contributes to a drop in the manufacturing cost of a vehicle mounted device control apparatus equipped with these switch units.

Moreover, in accordance with this invention, there is provided a vehicle mounted device control apparatus comprising a plurality of unit mounting sections each for accepting a switch unit which includes a circuit substrate having a required circuit pattern formed to contain a plurality of pairs of short-circuiting possible land portions and a switch, mounted on the circuit substrate, so that any one of the plurality of pairs of land portions are short-circuited selectively to set a switching function of the switch, and a switch unit decision section for, when the switch unit is mounted in one of the plurality of unit mounting sections, detecting the land portions short-circuited to automatically make a decision about a kind of the switching function of the mounted switch unit.

The means for detecting the short-circuited land portions can be a means in which the switch is connected between the land portion of the circuit pattern and a ground terminal. In this case, when the switch is turned on, since the voltage of an output terminal connected to the short-circuited land portions drops selectively to the ground voltage, the switch unit decision section can recognize the output terminal of the switch unit in which the voltage has dropped to the ground voltage, which enables the decision of the kind of the switch unit. Incidentally, for facilitating an electrical connection between the output terminal of the switch unit and the switch unit decision section, they can be connected through a connector to each other.

With the foregoing means, only in a manner that a plurality of pairs of short-circuiting possible land portions are provided simply on the switch unit side and the land portions predetermined according to the kind of the switching function of each switch unit are short-circuited selectively, the switch unit decision section side can automatically make a decision about the kind of each switch unit mounted in the unit mounting section. This can simplify the circuit arrangement of the vehicle mounted device control apparatus and perform the function thereof at a low cost. Additionally, since the detection of the short-circuited land portions, that is, the decision about the kind of the switching function of each switch unit, can be made through digital processing, the decision processing can be made at a high speed, and have a high resistance to noise.

BRIEF DESCRIPTION OF THE DRAWINGS

Other objects and features of the present invention will become more readily apparent from the following detailed description of the preferred embodiment taken in conjunction with the accompanying drawings in which:

FIG. 2 is a block diagram showing the vehicle mounted device control apparatus according to the embodiment;

DESCRIPTION OF THE PREFERRED EMBODIMENT

Figure 1:
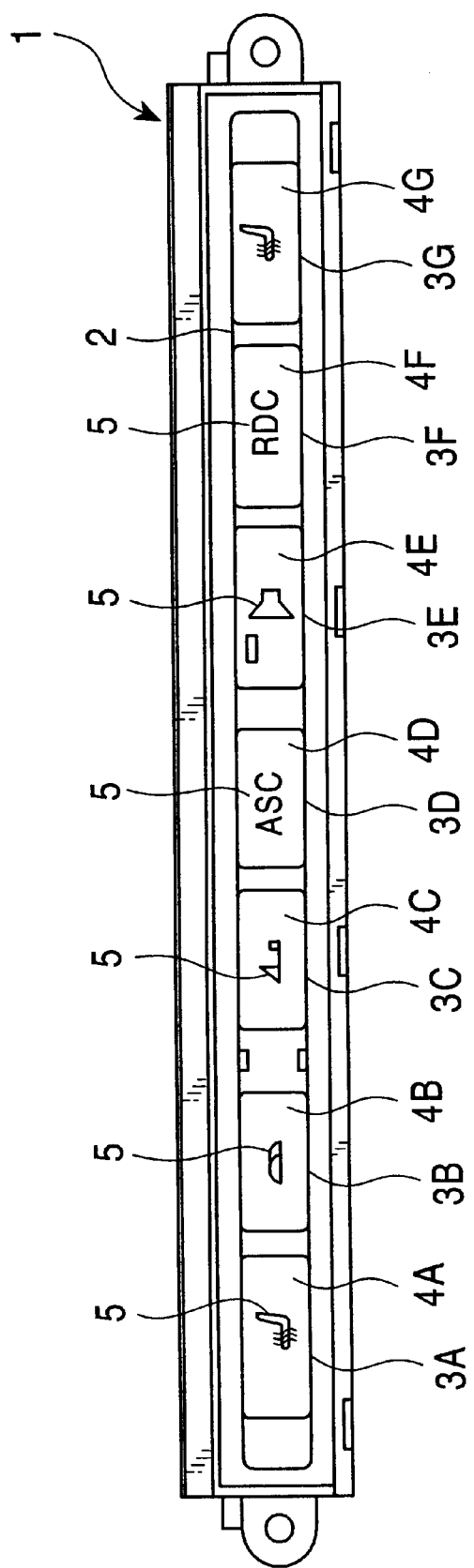
FIG. 1 is a front elevational view showing a vehicle mounted device control apparatus according to an embodiment of the present invention.

Referring to FIG. 1 showing a vehicle mounted device control apparatus according to the present invention, a switch unit 4A is for on-off control of heating for a driver's seat, a switch unit 4B is for closing control of a hood attached to a convertible type motor vehicle, a switch unit 4C is for opening control of the hood, a switching unit 4D is for automatic stability control, a switch unit 4E is for surround control (for sound), a switch unit 4F is for tire inflation pressure, and a switch unit 4G is for on-off control of heating for a passenger seat. For preventing mistaken assembling by manufacturer and mistaken manipulation by users, the contents of the respective functions are expressed with letters or pictographs 5 on the front surfaces of the switch units 4A to 4G, more concretely on the key tops. These letters or pictographs 5 can be developed in a transmission manner, that is, by transmission of lights from light-emitting diodes placed in the switch units 4A to 4G.

Each of the switch units 4A to 4G is an optional switch unit, and is mounted or non-mounted depending upon the vehicle mounted device control apparatus 1. Additionally, there are many types of switch units, such as for adjustment of the optical axis of a head lamp, for opening control of a trunk and for opening control of a cover for a fuel supply port. These switch units are set properly in arbitrary unit mounting sections 3A to 3G provided in the vehicle mounted device control apparatus 1.

Secondly, referring to FIGS. 2 and 3A to 3G, a description will be given hereinbelow of a circuit arrangement of the vehicle mounted device control apparatus according to the embodiment. FIG. 2 is a block diagram showing the vehicle mounted device control apparatus according to the embodiment, and FIGS. 3A to 3G are illustrations of circuit arrangements of various types of switch units.

As FIG. 2 shows, the vehicle mounted device control apparatus 1 according to this embodiment is composed of a control section (switch unit decision section) 6 comprising a CPU, and seven unit mounting sections 3A to 3G, with switch units shown in FIGS. 3A to 3G being set in the unit mounting sections 3A to 3G, respectively.

In each of the unit mounting sections 3A to 3G, first to seventh pins for connection of a switch unit are set as shown in FIG. 2. Of these pins, the first and sixth pins are connected through power supply bundled lines to power output terminals of the control section 6, the seventh pin is connected through light-emitting diode (LED) control bundled lines to a light-emitting diode control terminal of the control section 6, and the third to fifth pins are connected through input signal bundled lines to decision signal input terminals of the control section 6. Each of the decision signal input terminals of the control section 6 receives a voltage having a constant level (high level) at all times, and the control section 6 monitors the voltage level at each of the decision signal input terminals.

Furthermore, as shown in FIGS. 3A to 3G, each of the switch units 4A to 4G is equipped with first to seventh pin acceptance terminals (output terminals) for receiving the first to seventh pins installed in each of the unit mounting sections 3A to 3G and an eighth pin acceptance terminal (inspection terminal) to be used in the manufacturing process of each of the switch units 4A to 4G. Additionally, a first light-emitting diode LED1 is connected between the sixth pin acceptance terminal and a ground terminal, while a second light-emitting diode LED2 is connected between the first and seventh pin acceptance terminals. Still additionally, one set of contacts constituting a first pair of land portions L1, a second pair of land portions L2 and a third pair of land portions L3 connectable through the use of a jumper chip or the like are connected to the third pin acceptance terminal, the fourth pin acceptance and the fifth pin acceptance terminal, respectively, while each of push button switches SW1 to SW7 (S1 to S7) is connected between the other contacts constituting these land portions L1 to L3 and the ground terminal. A required circuit pattern including the aforesaid pin acceptance terminals and land portions L1 to L3 is formed on a circuit substrate (not shown).

Figure 3A:
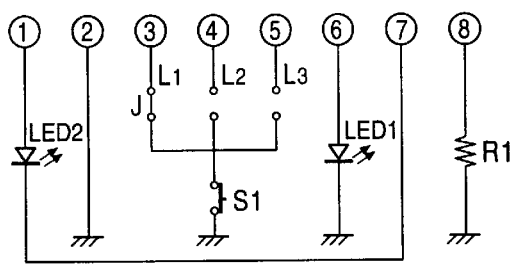
FIGS. 3A to 3G are illustrations of internal arrangements of various types of switch units for use in the vehicle mounted device control apparatus according to the embodiment.

In this configuration, as shown in FIG. 3A, in the switch unit 4A, only the first pair of land portions L1 are short-circuited through the use of a jumper chip J, while the second and third pairs of land portions L2 and L3 are in an open condition. Additionally, a fixed resistor R1 having a resistance peculiar to that switch unit 4A is connected between the eighth pin acceptance terminal and the ground terminal.

Figure 3B:
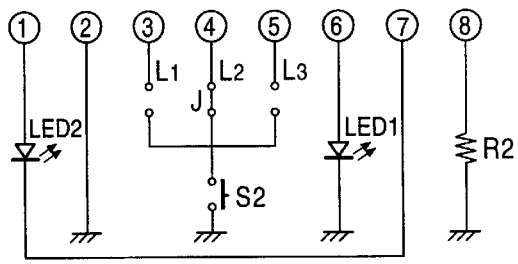

In the switch unit 4B, as shown in FIG. 3B, only the second pair of land portions L2 are short-circuited through the jumper chip J, while the first and third pairs of land portions L1 and L3 are in an open condition. Additionally, a fixed resistor R2 having a resistance value inherent to that switch unit 4B is connected between the eighth pin acceptance terminal and the ground terminal.

Figure 3C:
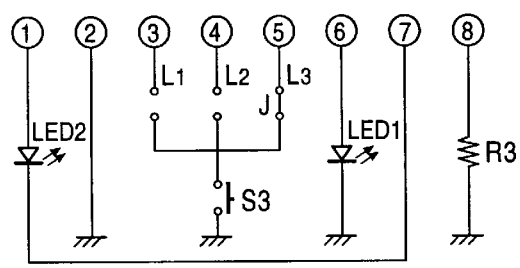

In the switch unit 4C, as shown in FIG. 3C, only the third pair of land portions L3 are short-circuited through the jumper chip J, while the first and second pairs of land portions L1 and L2 are released from connection. Additionally, a fixed resistor R3 having a resistance value inherent to that switch unit 4C is connected between the eighth pin acceptance terminal and the ground terminal.

Figure 3D:
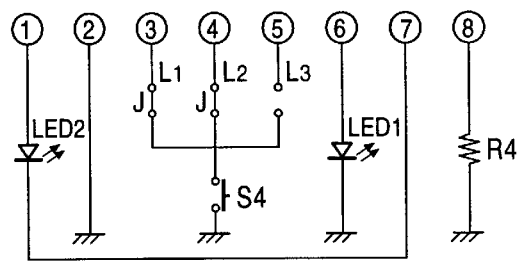

In the switch unit 4D, as shown in FIG. 3D, the first and second pairs of land portions L1 and L2 are short-circuited through jumper chips J, respectively, while the third pair of land portions L3 are released from connection. Additionally, a fixed resistor R4 showing a resistance value inherent to the switch unit 4D is connected between the eighth pin acceptance terminal and the ground terminal.

Figure 3E:
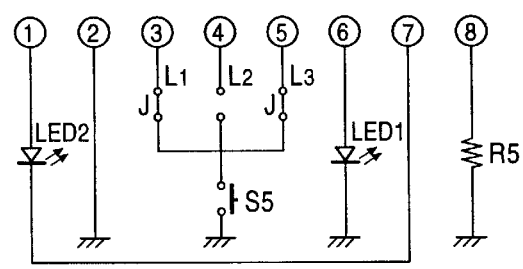

In the switch unit 4E, as shown in FIG. 3E, the first and third pairs of land portions L1 and L3 are short-circuited through jumper chips J, respectively, while the second pair of land portions L2 are released from connection. Additionally, a fixed resistor R5 showing a resistance value inherent to the switch unit 4E is connected between the eighth pin acceptance terminal and the ground terminal.

Figure 3F:
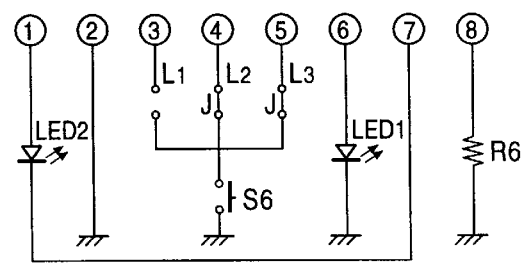

In the switch unit 4F, as shown in FIG. 3F, the second and third pairs of land portions L2 and L3 are short-circuited through jumper chips J, respectively, while the first pair of land portions L1 are released from connection. Additionally, a fixed resistor R6 showing a resistance value inherent to the switch unit 4F is connected between the eighth pin acceptance terminal and the ground terminal.

Figure 3G:
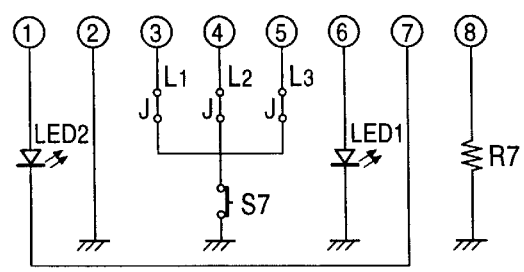

In the switch unit 4G, as shown in FIG. 3G, the first, second and third pairs of land portions L1, L2 and L3 are all short-circuited through jumper chips J. Additionally, a fixed resistor R7 showing a resistance value inherent to the switch unit 4G is connected between the eighth pin acceptance terminal and the ground terminal.

In this way, in the vehicle mounted device control apparatus according to this embodiment, the connection states of the three pairs of land portions L1, L2 and L3 establishing connecting relation to the third, fourth and fifth pin acceptance terminals are set to be peculiar to the switch units 4A to 4G, respectively, and the control section 6 side detects the connection states of these land portions L1, L2 and L3, thereby making a decision about which of the switch units is mounted in one unit mounting section for one switching function. Each of the fixed resistors R1 to R7 connected between the eighth pin acceptance terminals and the ground terminals permits the confirmation of the kind of each of the switch units 4A to 4G in the manufacturing process of the switch units 4A to 4G or in the mounting process of the switch units 4A to 4G in the unit mounting sections 3A to 3G, thereby preventing mistaken attachment to the unit mounting sections 3A to 3G. That is, the identification of the switch units 4A to 4G are properly feasible by measuring a voltage between the eighth pin acceptance terminal and the ground terminal through the use of a tester or the like.

Referring to FIGS. 2 and 3A to 3G, a description will be given hereinbelow of an operation of the vehicle mounted device control apparatus thus constructed.

First of all, when any one of switch units, for example the switch unit 4A, is mounted in the unit mounting section 3A, the first to seventh pins of the unit mounting section 3A are inserted into the first to seventh pin acceptance terminal of the switch unit 4A, respectively, so that the first and sixth pin acceptance terminals are connected through the power supply bundled lines to the power output terminals of the control section 6, while the seventh pin acceptance terminal is connected through the LED control bundled lines of the control section 6 to the light-emitting diode control terminal, and the third through fifth pin acceptance terminals are connected through the input signal bundled lines to the decision signal input terminals of the control section 6.

In this state, upon the on-operation of the switch SW1 of the switch unit 4A, the voltage of the third pin acceptance terminal connected to the land portions L1 short-circuited through the jumper chip J, that is, the voltage of the corresponding decision signal input terminal of the control section 6, drops to the ground level (a low level). As mentioned above, since a voltage of a constant level (high level) is applied to each of the decision signal input terminals of the control section 6 at all times and the voltage level at the decision signal input terminal is monitored by the control section 6, when the switch SW1 is turned on, only the voltage level at the decision signal input terminal corresponding to the third pin acceptance terminal in the unit mounting section 3A goes to the low level; therefore, the control section 6 automatically recognizes the fact of the mounting of the switch unit 4A in the unit mounting section 3A.

Likewise, when any one of the other switch units, for example the switch unit 4B, is mounted in the unit mounting section 3B and the switch SW2 of this switch unit 4B is turned on, the voltage at the decision signal input terminal corresponding to the fourth pin acceptance terminal connected to the land portions L2 short-circuited through the jumper chip J goes to the low level; hence, the control section 6 automatically recognizes the fact of the mounting of the switch unit 4B in the unit mounting section 3B.

Similarly, when any one of the remaining switch units, for example the switch unit 4C, is mounted in the unit mounting section 3C and the switch SW3 of this switch unit 4C is turned on, the voltage at the decision signal input terminal corresponding to the fifth pin acceptance terminal connected to the land portions L3 short-circuited through the jumper chip J goes to the low level; hence, the control section 6 automatically recognizes the mounting of the switch unit 4C in the unit mounting section 3B.

In like manner, when any one of the remaining switch units, for example the switch unit 4D, is mounted in the unit mounting section 3D and the switch SW4 of this switch unit 4D is turned on, the voltages at the decision signal input terminals corresponding to the third and fourth pin acceptance terminals connected to the land portions L1 and L2 short-circuited through the jumper chips J go to the low levels, which makes the control section 6 automatically recognize the mounting of the switch unit 4D in the unit mounting section 3D.

In a similar way, when any one of the remaining switch units, for example the switch unit 4E, is mounted in the unit mounting section 3E and the switch SW5 of this switch unit 4E is turned on, the voltages at the decision signal input terminals corresponding to the third and fifth pin acceptance terminals connected to the land portions L1 and L3 short-circuited through the jumper chips J go to the low levels, which makes the control section 6 automatically recognize the mounting of the switch unit 4E in the unit mounting section 3E.

In like manner, when any one of the remaining switch units, for example the switch unit 4F, is mounted in the unit mounting section 3F and the switch SW6 of this switch unit 4F is turned on, the voltages at the decision signal input terminals corresponding to the fourth and fifth pin acceptance terminals connected to the land portions L2 and L3 short-circuited through the jumper chips J go to the low levels, which makes the control section 6 automatically recognize the mounting of the switch unit 4F in the unit mounting section 3F.

Last, when any one of the remaining switch units, for example the switch unit 4G, is mounted in the unit mounting section 3G and the switch SW7 of this switch unit 4G is turned on, the voltages at the decision signal input terminals corresponding to the third, fourth and fifth pin acceptance terminals connected to the land portions L1, L2 and L3 short-circuited through the jumper chips J go to the low levels, which makes the control section 6 automatically recognize the mounting of the switch unit 4G in the unit mounting section 3G.

In this way, in the vehicle mounted device control apparatus according to this embodiment, when desired switch units 4A to 4G are connected to the unit mounting sections 3A to 3G, respectively, and the switches SW1 to SW7 provided in the switch units 4A to 4G are actuated, on the basis of the voltage levels at the decision signal input terminals, the control section 6 can immediately identify each of the kinds of the plurality of switch units 4A to 4G connected to the unit mounting sections 3A to 3G.

In addition, in the vehicle mounted device control apparatus according to this embodiment, a circuit pattern including a plurality of pairs of short-circuiting possible land portions L1, L2 and L3 and output terminals is formed in each of the switch units 4A to 4G and any one of the plurality of pairs of land portions L1, L2 and L3 are selectively short-circuited to set a switching function of each of the switch units, and this permits the use of a circuit pattern, formed in a circuit substrate, in common to various types of switch units different in switching function from each other, and further provides a switch unit with a required switching function only by short-circuiting a predetermined pair of land portions through the use of a jumper chip or the like, thus decreasing the manufacturing cost of various types of switch units and, in turn, the manufacturing cost of a vehicle mounted device control system equipped with these switch units.

Still additionally, in the vehicle mounted device control apparatus according to this embodiment, only in a manner that any one of the switch units 4A to 4G is mounted in any one of the unit mounting sections 3A to 3G and one of the switches SW1 to SW7 provided in the one of the switch units 4A to 4G is then turned on, it is possible to automatically detect the short-circuited position of the land portions L1, L2 and L3 in the mounted switch of the unit mounting sections 3A to 3G to identify the mounted switch of the switch units 4A to 4G. This can simplify the circuit arrangement of the vehicle mounted device control apparatus and allows the detection of the short-circuited land portions, that is, the decision about the kind of switching function of each of the switch units 4A to 4G to be made in a digital manner; therefore, the decision processing becomes higher in speed, and has a high noise immunity.

Figure 4:
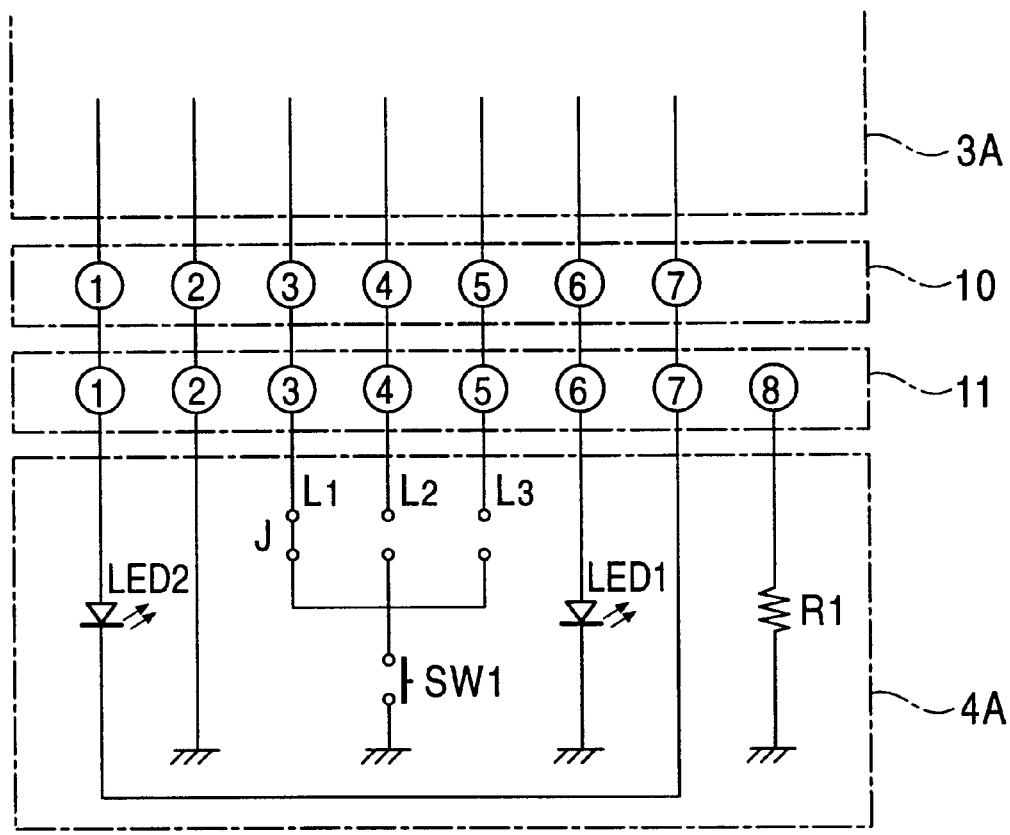
FIG. 4 is a block diagram showing a state where a unit mounting section and a switch unit are connected through a connector to each other.

Incidentally, in the above-described embodiment, although the pins of the unit mounting sections 3A to 3G are inserted into the pin acceptance terminals of the switch units 4A to 4G to establish the connection between the unit mounting sections 3A to 3G and the switch units 4A to 4G, it is also appropriate that, in order to facilitate and make sure the connection between the unit mounting sections 3A to 3G and the switch units 4A to 4G, as shown in FIG. 4, the unit mounting sections 3A to 3G and the switch units 4A to 4G are both provided with connectors 10 and 11 so that they are connected electrically to each other through the connectors 10 and 11.

In addition, in the above-described embodiment, although the vehicle mounted device control apparatus is equipped with seven unit mounting sections 3A to 3G and seven switch units 4A to 4G are mounted in these unit mounting sections 3A to 3G, no limitation is imposed on the numbers of the unit mounting sections and the switch units, but the numbers of the unit mounting sections and the switch units can be set arbitrarily according to needs.

Still additionally, in the above-described embodiment, although three pairs of land portions L1, L2 and L3 are provided in each of the switch units 4A to 4G, no limitation is imposed on the number of land portions, but the number thereof can be set arbitrarily according to need.

Moreover, in the above-described embodiment, although two light-emitting diodes LED1 and LED2 are provided in each of the switch units 4A to 4G, the number of light-emitting diodes can also be one when needed, or all the light-emitting diodes can be omitted.

According to this invention, since a required circuit pattern including a plurality of pairs of short-circuiting possible land portions is formed in each switch unit and any one of these pairs of land portions are short-circuited selectively to set a switching function of each switch unit, this permits the use of a circuit pattern, formed in a circuit substrate, in common to various types of switch units different in switching function from each other, and further provides a switch unit with a required switching function only by establishing short-circuiting of predetermined land portions, thus decreasing the manufacturing cost of switch units and, in turn, the manufacturing cost of a vehicle mounted device control system equipped with many kinds of switch units.

In addition, according to this invention, a display showing a switching function is located on an outer surface of each of the key tops for switch manipulation, it is possible to prevent mistaken assembling by manufacturer and mistaken operation by the user.

Moreover, according to this invention, since a switch unit decision section is provided to detect the short-circuited land portions for automatically making a decision on the kind of a switching function of the switch unit mounted in a unit mounting section, after one switch unit is mounted in a unit mounting section, it is possible to automatically identify the kind of switch unit mounted in the unit mounting section only by turning on a switch provided in the switch unit, and further to simplify the circuit arrangement of the vehicle mounted device control apparatus and provide it at a low cost. Additionally, since the decision about the type of switch unit mounted can be made in a digital manner, the decision processing can be conducted quickly, and has a high noise immunity.

Still moreover, according to this invention, a unit mounting section and the terminals of a switch unit are connected electrically through a connector, it is possible to facilitate and make sure the connection between the unit mounting section and the switch unit.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the invention.

What is claimed is:

1. A switch unit comprising a circuit substrate having a required circuit pattern formed to include a plurality of pairs of land portions, and a switch mounted on said circuit substrate, wherein each pair of said plurality of pairs of land portions is short-circuited selectively, a combination of short-circuited land portions to set a switching function of said switch.

2. A switch unit according to claim 1, wherein a display to show said switching function of said switch is provided on an outer surface of a key top to manipulate said switch.

3. A switch unit according to claim 1, wherein each pair of land portions that are short-circuited land portion are short-circuited by a jumper chip.

4. A switch unit according to claim 1, wherein each combination of short-circuited land portions correspond to a different switching function.

5. A switch unit according to claim 1, wherein one end of each of the pairs of land portions are connected with each other and are connected with the switch.

6. A switch unit according to claim 1, further comprising a land portion connected with a resistor having a resistance dependent on the combination of short-circuited land portions.

7. A switch unit according to claim 1, wherein, in one state, the switch grounds one end of each of the pairs of land portions.

8. A vehicle mounted device control apparatus comprising a plurality of unit mounting sections each to accept a switch unit which includes a circuit substrate having a required circuit pattern formed to contain a plurality of pairs of land portions and a switch mounted on said circuit substrate such that each pair of said plurality of pairs of land portions is short-circuited selectively, a combination of short-circuited land portions to set a switching function of said switch, and a switch unit decision section to, when said switch unit is mounted in one of said plurality of unit mounting sections, detect said land portions short-circuited to automatically make a decision about a kind of said switching function of the mounted switch unit.

9. A vehicle mounted device control apparatus according to claim 8, wherein each pair of land portions that are short-circuited land portion are short-circuited by a jumper chip.

10. A vehicle mounted device control apparatus according to claim 8, wherein each combination of short-circuited land portions in each switch unit correspond to a different switching function.

11. A vehicle mounted device control apparatus according to claim 8, wherein one end of each of the pairs of land portions in each switch unit are connected with each other and are connected with the switch of that switch unit.

12. A vehicle mounted device control apparatus according to claim 8, each switch unit further comprising a land portion connected with a resistor having a resistance dependent on the combination of short-circuited land portions.

13. A vehicle mounted device control apparatus according to claim 8, wherein, in one state, each switch of each switch unit grounds one end of each of the pairs of land portions.

14. A vehicle mounted device control apparatus according to claim 8, wherein said switch unit and said unit mounting section are connected electrically to each other through a connector.

* * * * *